Patented July 11, 1944

2,353,441

UNITED STATES PATENT OFFICE 2,353,441

PROCESS FOR REMOVING TOLUENE FROM p-TOLUENE SULPHONIC ACID

William B. Brown, Westmont, N. J., assignor to Allied Chemical & Dye Corporation, New York, N. Y., a corporation of New York No Drawing. Application March 6, 1942, Serial No. 433,593

4 Claims. (Cl. 202—46)

This invention relates to an improvement in the production of p-toluene sulphonic acid, more particularly to a method for removing toluene from p-toluene sulphonic acid.

As is well known, p-toluene sulphonic acid is usually prepared by reacting toluene with sulphuric acid in any suitable manner. This acid is useful chiefly in that it may be readily converted to the corresponding cresol by neutralizing, fusing the sulphonate with a strong alkali and liberating the cresol from the cresolate thus formed. In many cases, however, it will be found that an appreciable amount of toluene remains in the p-toluene sulphonic acid; from an economic standpoint it is highly desirable to remove this toluene from the p-toluene sulphonic acid before the acid is neutralized in order to recover the toluene for re-use. Removal of this toluene has previously been carried out by diluting the sulphonic acid with water whereby the substantially water-insoluble toluene separates from the sulphonic acid solution; however, this method is extremely wasteful since the separation is at best inefficient and since large quantities of water are added to the sulphonic acid which must eventually be evaporated.

As pointed out in Richter's "Organic Chemistry" (D'Albe's translation), vol. 2, page 173 (1922), decomposition of aromatic sulphonic acids occurs readily by subjecting the sulphonic acids to contact with steam, thereby forming the corresponding aromatic hydrocarbon and sulphuric acid. Because of this decomposition all attempts made to separate toluene from p-toluene sulphonic acid by steam distillation have, to the best of my knowledge, been impractical.

It is the object of this invention to provide an efficient and economical method for removing toluene from p-toluene sulphonic acid.

I have made the discovery that toluene may be removed from p-toluene sulphonic acid without substantial decomposition of the acid by subjecting the acid in molten condition to steam distillation while controlling the temperature of the mass so as to maintain it below about 120° C. It is highly important in carrying out my invention that the temperature of the sulphonic acid be controlled at all times so as to maintain it below about 120° C. because I have found that if the temperature of the molten mass is permitted to rise substantially above this value substantial hydrolysis of the sulphonic acid occurs. The temperature of the mass may be maintained below about 120° C. in any suitable manner; for example, the temperature of the steam employed or the rate of flow thereof through the acid may be suitably controlled or the molten sulphonic acid mass being treated may be cooled by suitable means disposed therein. I prefer to carry out the process of my invention at temperatures between about 100° and about 120° C. By operating in this manner I have found that toluene may be removed from p-toluene sulphonic acid practically completely without incurring any substantial loss of the desired acid.

The p-toluene sulphonic acid treated in accordance with my invention may contain, in addition to the toluene present therein, appreciable amounts of its isomers, i. e., o- and m-toluene sulphonic acids, which tend to be formed during sulphonation. The p-toluene sulphonic acid may suitably be prepared by refluxing a mixture of toluene and concentrated sulphuric acid, condensing the vapors evolved from the reaction mixture, separating water therefrom, returning toluene to the reaction mixture and refluxing the mixture until an amount of water equivalent to the amount present in the sulphuric acid plus at least about 40%, preferably between about 40% and about 75%, of the theoretical amount of water of reaction has been removed from the mixture, as disclosed and claimed in my copending application Serial No. 433,594, filed March 6, 1942. However, it is to be understood that removal of toluene from p-toluene sulphonic acid in accordance with my invention may be carried out on acid containing toluene prepared by other processes.

In carrying out my invention, steam at a temperature between about 100° and about 120° C., and preferably about 100° C., is passed through molten p-toluene sulphonic acid; the sulphonic acid treated may suitably be the hot sulphonation product removed from the sulphonation pot in which sulphonation of the toluene has been carried out, said acid being at a temperature between about 80° and about 120° C. The temperature of the acid, which may tend to rise chiefly because of the heat evolved on absorption of steam by the acid, is maintained below about 120° C., preferably between about 100° and about 120° C., by suitably regulating the temperature and rate of flow of the steam and, if necessary, cooling the molten p-toluene sulphonic acid. The rate of flow of the steam through the acid may vary and depends on the size and nature of the apparatus, on whether artificial cooling means are employed and on the temperature of the steam. The amount of toluene present in the sulphonic acid may vary, depending on the method employed in preparing the acid, but usually is between about 20% and about 50% of the weight of the mass. If desired, a portion of the toluene may be removed by simple distillation prior to the steam distillation; simple distillation, however, cannot effect the removal of sufficient toluene from the acid, so that steam distillation must be utilized to accomplish such removal. If the acid to be treated contains a small amount of toluene, e. g., 5%, simple distillation will accomplish no useful purpose. In some cases cooling of the molten mass may not be necessary to maintain the temperature of the sulphonic acid below 120° C., e. g., when steam at a temperature of about 100° C. is passed through the sulphonic acid at a low rate of flow.

The steam passing through the molten acid removes the toluene therefrom; upon condensation of the steam-toluene mixture, the toluene separates from the water and is thus recovered for re-use. The p-toluene sulphonic acid product obtained by my invention will be found to be substantially free of toluene; it contains only about 15% water and, hence, may suitably be neutralized by direct treatment with an alkali metal hydroxide or an alkali metal salt of a weak acid, the anhydride of which is gaseous, as described in the copending application of S. P. Miller, Serial No. 396,877, filed June 6, 1941.

The following example is illustrative of my invention; amounts are given in parts by weight.

606 parts of toluene were heated to refluxing and 295 parts of 95% sulphuric acid were added gradually to the refluxing toluene over a period of 47 minutes. The vapors evolved from the reaction mixture were condensed, the water layer discarded and the toluene returned to the reaction mixture. When an amount of water equivalent to the amount present in the sulphuric acid plus 70.8% of the theoretical amount of water of reaction had been removed from the mixture in this manner, which required about 9¾ hours, refluxing of the mixture was discontinued. The product, containing about 85% p-toluene sulphonic acid, as determined by the cresol prepared from the acid, was then steam distilled by passing steam at a temperature of about 100° C. therethrough, the temperature of the mass being maintained below 120° C. It was found the product thus obtained contained practically no toluene; the steam distillation did not effect substantial decomposition of the p-toluene sulphonic acid.

Since certain changes may be made in carrying out the above process without departing from the scope of the invention, it is intended that all matter contained in the above description shall be interpreted as illustrative and not in a limiting sense.

I claim:

1. A process for removing toluene from p-toluene sulphonic acid which comprises subjecting molten p-toluene sulphonic acid containing toluene to steam distillation while maintaining the temperature of the melt below about 120° C.

2. A process for removing toluene from p-toluene sulphonic acid which comprises steam distilling molten p-toluene sulphonic acid containing toluene while maintaining the temperature of the melt between about 100° and about 120° C. until substantially all the toluene has been removed therefrom.

3. A process for removing toluene from p-toluene sulphonic acid which comprises passing steam at a temperature between about 100° and about 120° C. through molten p-toluene sulphonic acid containing toluene while cooling the melt to maintain its temperature between 100° and about 120° C. for a time sufficient to remove substantially all the toluene therefrom.

4. A process for removing toluene from p-toluene sulphonic acid obtained by refluxing a mixture of concentrated sulphuric acid and toluene in an amount in excess of that theoretically required to react with the acid, condensing the vapors evolved from the mixture, separating the water, returning the toluene to the mixture and refluxing the mixture until an amount of water equivalent to the amount present in the sulphuric acid plus between about 40% and about 75% of the theoretical amount of water of reaction has been removed from the mixture, which comprises passing steam at a temperature between about 100° and about 120° C. through the molten p-toluene sulphonic acid while cooling the melt to maintain its temperature between about 100° and about 120° C. for a time sufficient to remove substantially all the toluene therefrom.

WILLIAM B. BROWN.

CERTIFICATE OF CORRECTION.

Patent No. 2,353,441.  July 11, 1944.

WILLIAM B. BROWN.

It is hereby certified that error appears in the printed specification of the above numbered patent requiring correction as follows: Page 2, second column, line 28, claim 3, after "between" insert --about--; and that the said Letters Patent should be read with this correction therein that the same may conform to the record of the case in the Patent Office.

Signed and sealed this 22nd day of August, A. D. 1944.

Leslie Frazer (Seal)   Acting Commissioner of Patents.